United States Patent [19]

Matsumura et al.

[11] Patent Number: 4,632,532

[45] Date of Patent: Dec. 30, 1986

[54] FOCUS DETECTING APPARATUS

[75] Inventors: Susumu Matsumura, Yokohama; Takashi Kawabata, Kamakura; Tokuichi Tsunekawa, Yokohama; Yuichi Sato, Kawasaki, all of Japan

[73] Assignee: Canon Kabushiki Kaisha, Tokyo, Japan

[21] Appl. No.: 759,939

[22] Filed: Jul. 29, 1985

Related U.S. Application Data

[63] Continuation of Ser. No. 666,681, Oct. 31, 1984, abandoned.

[30] Foreign Application Priority Data

Nov. 2, 1983 [JP] Japan .................................. 58-206297

[51] Int. Cl.4 ............................................... G03B 3/00
[52] U.S. Cl. ..................................... 354/403; 354/407
[58] Field of Search ................................. 354/403, 407

[56] References Cited

U.S. PATENT DOCUMENTS

| 4,025,785 | 5/1977 | Mueller | 354/403 |
| 4,357,085 | 11/1982 | Niwa et al. | 354/403 |
| 4,511,232 | 4/1985 | Yamada | 354/403 |
| 4,542,971 | 9/1985 | Numata | 354/403 |

Primary Examiner—Russell E. Adams
Attorney, Agent, or Firm—Fitzpatrick, Cella, Harper & Scinto

[57] ABSTRACT

In a focus detecting apparatus for detecting the focus state of an objective lens on the basis of a light passing through the objective lens, a field lens is disposed near the predetermined imaging plane of the objective lens, and a projecting optical system for projecting the light from a light source onto an object through a first area of the pupil of the objective lens and a light-receiving optical system for forming a plurality of images on a sensor on the basis of lights passing through second and third areas of the pupil of the objective lens are disposed rearward of the image of the pupil of the objective lens formed by the field lens, whereby both focus detection based on the projected light and focus detection not based on the projected light can be accomplished.

18 Claims, 11 Drawing Figures

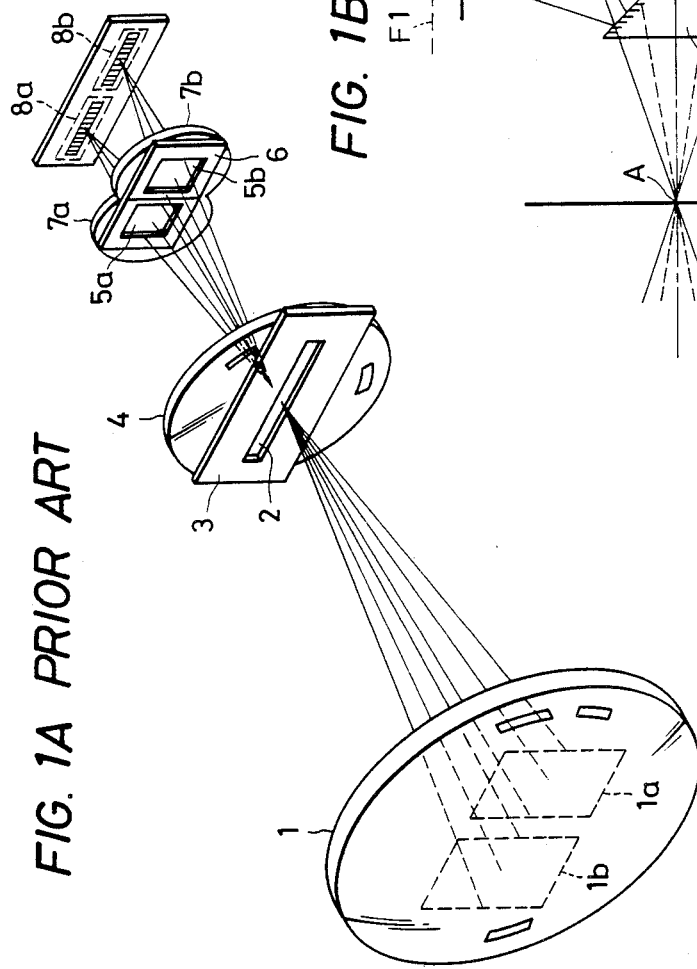
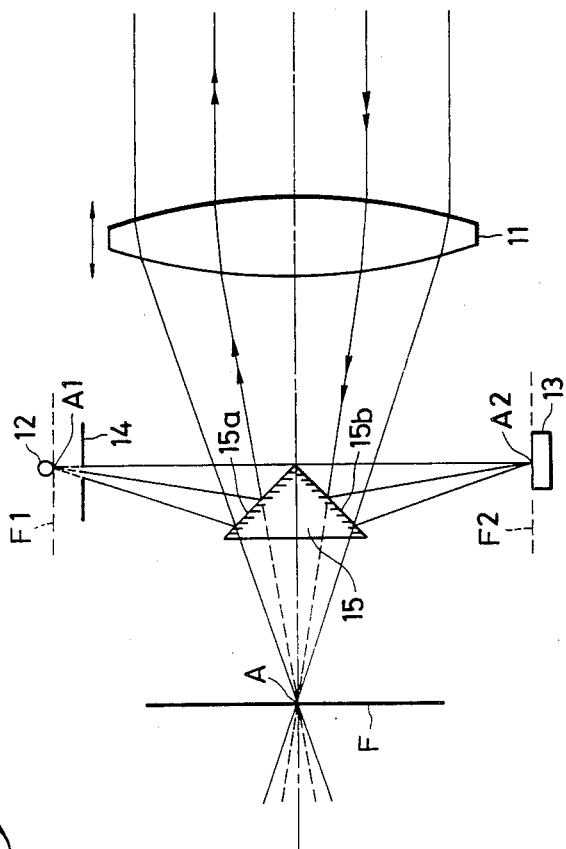
FIG. 1A PRIOR ART
FIG. 1B PRIOR ART

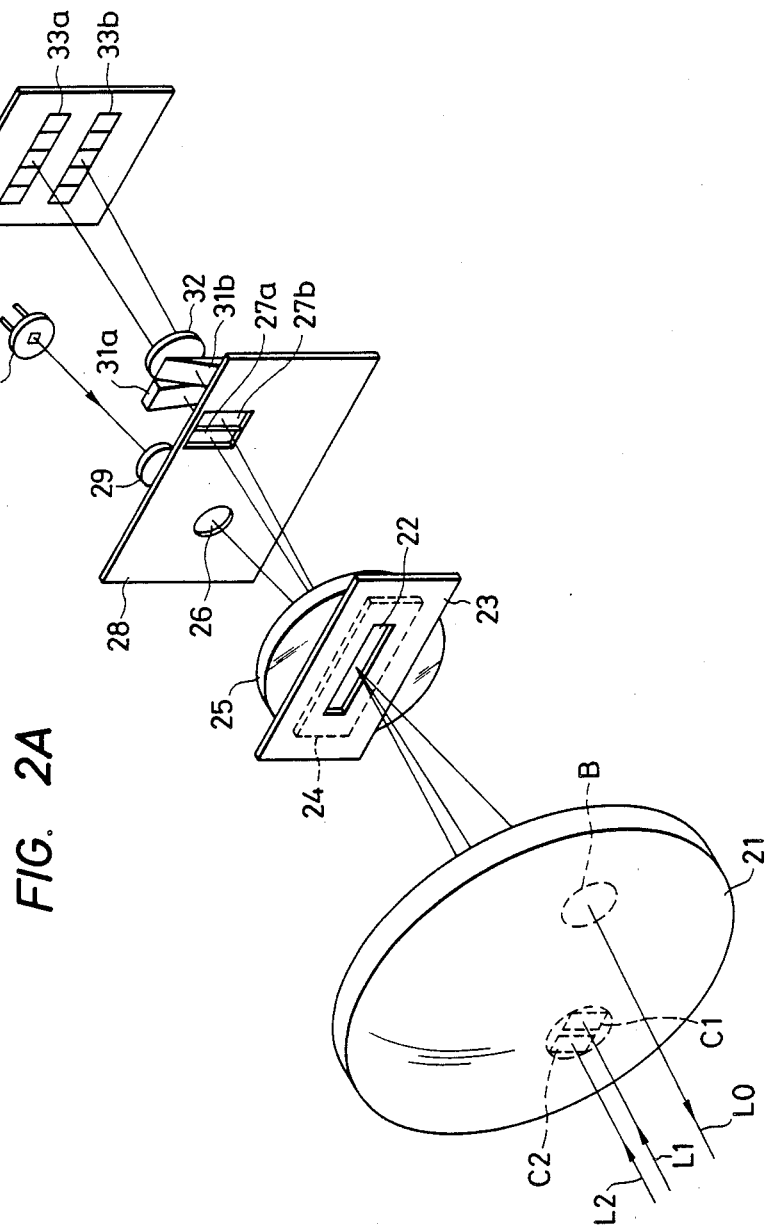

FOCUS DETECTING APPARATUS

This application is a continuation of application Ser. No. 666,681 filed Oct. 31, 1984 now abandoned.

BACKGROUND OF THE INVENTION

1. Field of the Invention

This invention relates to a so-called TTL (through-the-lens) type focus detecting apparatus for detecting the focus of an objective lens on the basis of a light passing through the objective lens.

2. Description of the Prior Art

Focus detecting apparatuses of this type are well known, and also known is an apparatus in which, for example, the pupil of an objective lens is divided and the focus state of the objective lens is detected from the relative positional relation between a plurality of images formed by the light beams from the areas of the divided pupil.

FIGS. 1A and 1B of the accompanying drawings schematically show the construction of such apparatus. In FIG. 1A, reference numeral 1 designates the photo-taking lens of a camera, not shown. In this apparatus, there are disposed, in succession from the side of the photo-taking lens 1, a field stop 3 having an opening 2, a field lens 4, a stop 6 having openings 5a and 5b, secondary imaging lenses 7a and 7b and sensor arrays 8a and 8b. The field stop 3 is disposed in the predetermined imaging plane of the photo-taking lens 1 so that the image in the opening 2 is re-imaged on the photoelectric element arrays 8a and 8b by the secondary imaging lenses 7a and 7b. The field lens 4 has a power for placing the exit pupil of the photo-taking lens 1 and the surface of the stop 6 substantially in an imaging relation. Accordingly, a light passed through the area 1a of the exit pupil of the photo-taking lens 1 enters the opening 5a of the stop 6 and is imaged on the sensor array 8a. Also, a light passed through the area 1b of the exit pupil of the photo-taking lens 1 enters the opening 5b of the stop 6 and is imaged on the sensor array 8b.

When the photo-taking lens 1 is in its in-focus state, the distributions of quantity of light of the images re-imaged on the two sensor arrays 8a and 8b are equal to each other on the light-receiving surfaces of the sensor arrays 8a and 8b. On the other hand, when the photo-taking lens 1 is in its non-in-focus state, the distributions of quantity of light of the images re-imaged on the sensor arrays 8a and 8b vary relative to each other in accordance with the defocus amount of the lens 1 and therefore, the focus state of the photo-taking lens 1 can be determined through the correlation between the two distributions of quantity of light on the basis of the output signals from the two sensor arrays 8a and 8b.

However, in the focus detecting apparatus of this type according to the prior art, when the object to be photographed is dark, a sufficient quantity of light cannot be directed onto the sensors, and this has sometimes caused malfunctioning or the impossibility of judging the in-focus.

In such a case, there would occur to mind a countermeasure that the object to be photographed be illuminated by auxiliary illuminating means provided outside the optical path of the photo-taking lens 1 to thereby direct a sufficient quantity of light onto the sensors, but the use of such illuminating means provided outside the optical path of the photo-taking lens 1 may result in creation of parallax, which in turn may lead to a problem that the auxiliary light cannot be well directed into a distant field of view.

On the other hand, an apparatus in which a light beam is projected onto an object to be photographed through a photo-taking lens and the reflected light from the object to be photographed is directed to a sensor through the photo-taking lens to thereby detect the focus state of the photo-taking lens is disclosed, for example, in U.S. Pat. No. 4,357,085 (issued on Nov. 2, 1982). FIG. 1B of the accompanying drawings shows the basic construction of such apparatus. As shown there, a light source 12 and the light-receiving surface of a sensor 13 are disposed in planes F1 and F2, respectively, optically equivalent to the film surface F of a camera relative to a photo-taking lens 11. A light beam emitted from the light source 12 passes through a stop 14 and is reflected by the mirror 15a of a reflecting member 15, and passes through the photo-taking lens 11 and is projected onto an object to be photographed. The reflected light from the object to be photographed passes through the photo-taking lens 11, and then is reflected by a mirror 15b and enters the sensor 13.

When the photo-taking lens 11 is imaging the object to be photographed at a point A on the film surface F, the light source 12 is imaged on the object to be photographed by the photo-taking lens 11 and the spots of received light on the sensor 13 are imaged at a position A2 optically equivalent to the position A1 of the light source 12. However, when the photo-taking lens 11 is in its front focus state or its rear focus state, the spots of received light on the sensor 13 are deviated in opposite directions from the position A2 and therefore, by detecting the positions of the spots of received light, it is possible to determine whether the photo-taking lens 11 is in its in-focus state.

However, in this apparatus, when the object to be photographed lies at a long distance, the quantity of light reflected from the object to be photographed and entering the sensor 13 is reduced and therefore, a signal of good S/N ratio cannot be obtained, and this has resulted in the disadvantage that determination of in-focus cannot be accomplished.

SUMMARY OF THE INVENTION

The present invention has been made in view of the above-noted situation and an object thereof is to provide a focus detecting apparatus which can accomplish accurate focus detection even when the brightness of the object to be photographed is low or even when the object to be photographed lies at a long distance.

Other objects of the present invention will become apparent from the following detailed description of some embodiments of the invention taken in conjunction with the accompanying drawings.

BRIEF DESCRIPTION OF THE DRAWINGS

FIGS. 1A and 1B show a TTL type focus detecting apparatus according to the prior art.

FIGS. 2A and 2B show an embodiment of the focus detecting apparatus of the present invention.

DESCRIPTION OF THE PREFERRED EMBODIMENTS

Description of each embodiment is made by taking as an example a case where the present invention is incorporated into a camera.

Figure 2B:
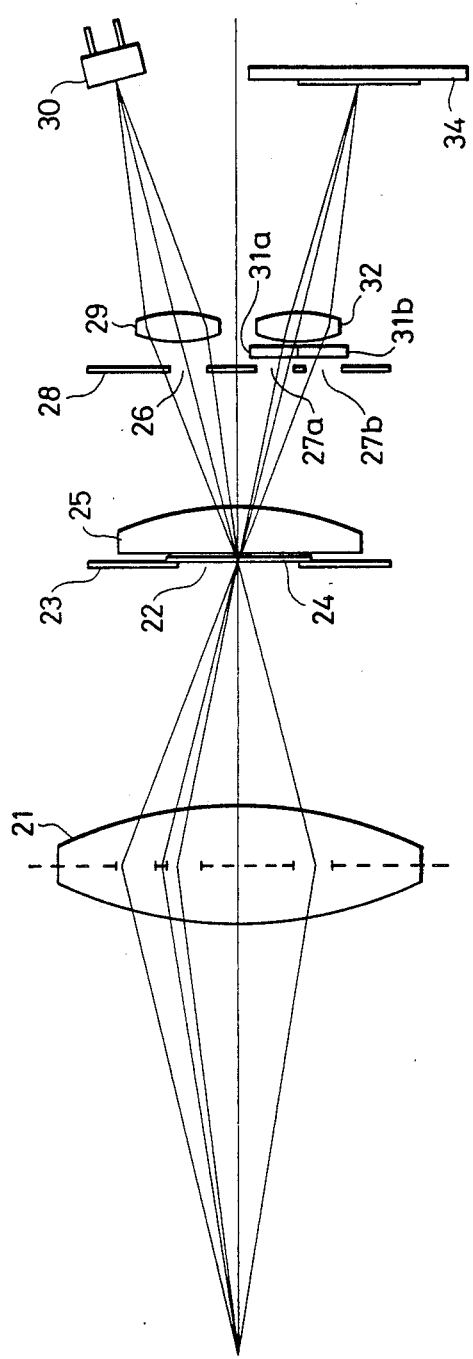

Referring to FIGS. 2A and 2B, reference numeral 21 designates a photo-taking lens mounted on a camera, not shown. Rearward of this photo-taking lens 21, there are successively arranged a light-intercepting plate 23 having a field opening 22 positioned near a plane (predetermined imaging plane) optically equivalent to the film surface of the camera, not shown, an optical filter 24 provided immediately behind the light-intercepting plate 23, a field lens 25, and a light-intercepting plate 28 having openings 26, 27a and 27b. A projection lens 29 and a light source 30 comprising a light-emitting diode or a semiconductor laser are provided rearward of the opening 26. Wedge prisms 31a and 31b are disposed rearward of the openings 27a and 27b, respectively, a common secondary imaging lens 32 is disposed rearward of the wedge prisms, and a sensor 34 having two independent line sensors 33a and 33b is positioned rearward of the secondary imaging lens. The field lens 25 has the function of substantially imaging the exit pupil of the photo-taking lens 21 on the plane of the light-intercepting plate 28, and the openings 26, 27a and 27b of the light-intercepting plate 28 are substantially imaged in areas B, C1 and C2, respectively, on the pupil of the photo-taking lens 21.

The light source 30 is imaged at the center of the field opening 22, i.e., on the optic axis of the photo-taking lens 21, by the projection lens 29, and a detecting light beam passes through the area B of the pupil of the photo-taking lens 21 and is projected as a projected light ray L0 onto an object to be photographed. Also, the field opening 22 is imaged on the line sensors 33a and 33b by the wedge prisms 31a, 31b and the secondary imaging lens 32 through the openings 27a and 27b. Of the reflected light from the object to be photographed, only the light beams L1 and L2 passed through the pupil areas C1 and C2, respectively, of the photo-taking lens 21 pass through the field opening 22 and thereafter pass through the field lens 25 and the openings 27a, 27b and are imaged on the line sensors 33a and 33b by the secondary imaging lens 32.

As is apparent from FIG. 2B which shows this construction from a side thereof, the projection system and the light-receiving system of this embodiment seem to be generally similar to the optical system of the prior art shown in FIG. 1B, but in the case of the present embodiment, there is a unique feature in that the light-receiving system itself is a two-image displacement detecting optical system as shown in FIG. 1A. That is, the light-receiving system in the present embodiment is designed to have a TTL active type in-focus detecting function for an object at a short distance and to function as a passive type image displacement in-focus detecting system for an object at a long distance.

As the optical filter 24, use is made of one having the characteristic of transmitting therethrough only the light in the vicinity of the wavelength of the light source 30 which has a strong intensity of emitted light and having the property of eliminating any excess extraneous light from the light-receiving system. Also, in FIG. 2A, it is ideal that the optic axis of the projection system lies in a plane formed by the lengthwise direction of the field opening 22 and the optic axis of the photo-taking lens 21. The reason is that when the photo-taking lens 21 is not accurately focus-adjusted to the object to be photographed, the projected light spot deviates from the optic axis and therefore, if the direction of such deviation and the lengthwise direction of the field opening 22 are not coincident with each other, the spot of the object to be photographed will be imaged outside the field opening 22 and the quantity of light reaching the sensor will decrease considerably.

Also, it is desirable that the area B and the areas C1 and C2 formed on the pupil plane of the photo-taking lens 21 be deviated from a position point-symmetrical with respect to the optic axis of the photo-taking lens 21. This is to prevent reflected light on the inner surface of the photo-taking lens 21 from coming around to the light-receiving system.

Figure 3A:
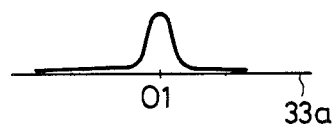
FIGS. 3A and 3B show examples of the distribution of quantity of light on a sensor in the present embodiment.
Figure 3A:
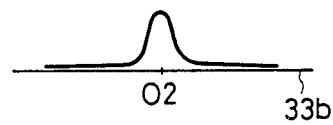
Figure 3B:
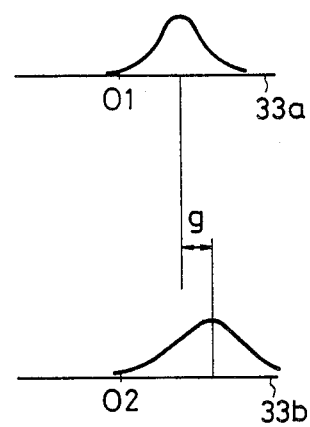

In a state in which the photo-taking lens 21 is focused to the object to be photographed, the distributions of quantity of light of the images formed on the line sensors 33a and 33b are such as shown in FIG. 3A. FIG. 3A shows the distribution of quantity of light on the line sensor 33b, and in these Figures, 01 and 02 represent the points at which the projected light spot is imaged on the field opening 22 as the points shown on the line sensors 33a and 33b. The distributions of quantity of light on the line sensors 33a and 33b when the photo-taking lens 21 is in its rear focus state are such as shown in FIG. 3B. In this case, the peak positions of the distribution of quantity of light deviate from the points 01 and 02, and even between the peak positions, an image displacement indicated by a spacing g occurs between the sensor arrays 33a and 33b.

Accordingly, even if the object distance is long and the quantity of the reflected light of the projected light beam by the object to be photographed is small, if the object itself is illuminated brightly by extraneous light, it is possible to detect the amount of image displacement between the sensor arrays 33a and 33b shown in FIG. 3B and determine whether the photo-taking lens is in focus.

Also, the projection system in the present embodiment should desirably be one having the emitted light intensity peak in infrared light, and the optical filter 24 in this case may be a suitable visible light cutting filter.

Figure 4A:
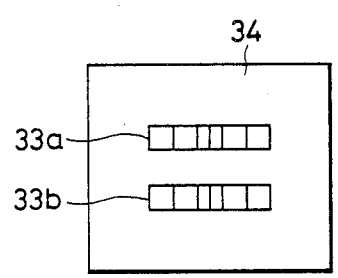
FIGS. 4A and 4B show modifications of the sensor in the present embodiment.
Figure 4B:
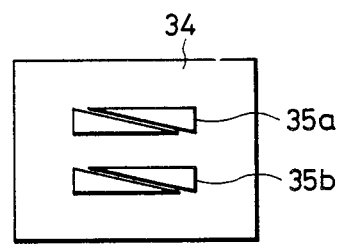

FIGS. 4A and 4B illustrate preferred forms of the sensor utilized in the present invention. FIG. 4A shows an example in which the central ones of the picture elements constituting the line sensors 33a and 33b are made smaller than the picture elements at the opposite ends of the line sensors. FIG. 4B shows an example in which the line sensors are changed to two position detecting divisional sensors 35a and 35b. The use of such sensors leads not only to a lower cost but also to an advantage that the peak detection processing circuit can be simplified.

Figure 5:
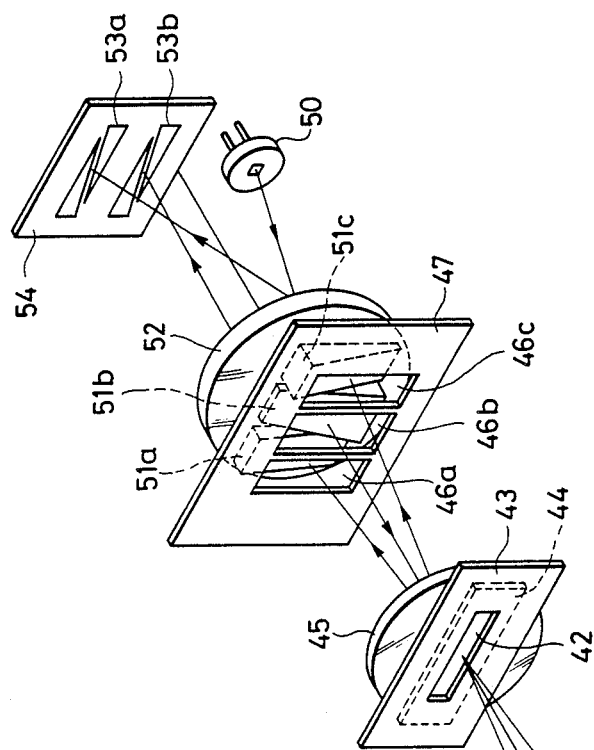
FIG. 5 shows another embodiment of the present invention.
Figure 5:
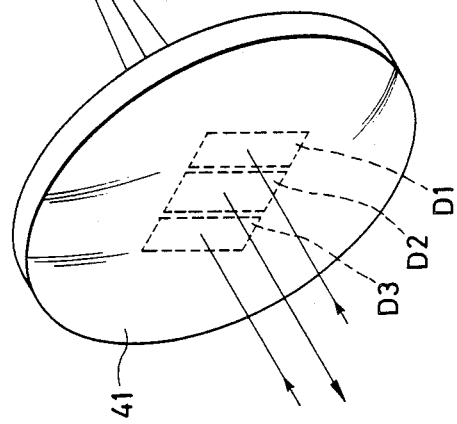

FIG. 5 shows another embodiment of the present invention. In this embodiment, a light-intercepting plate 43 installed in a plane optically equivalent to the film surface with respect to a photo-taking lens 41 has a field opening 42, and an optical filter 44 and a field lens 45 are successively disposed immediately behind the field opening 42, and a light-intercepting plate 47 having three openings 46a, 46b and 46c is provided rearward of the field lens 45. Wedge prisms 51a, 51b and 51c are disposed immediately behind the openings 46a, 46b and 46c, respectively, and a secondary imaging lens 52 disposed rearward of these prisms is adapted to form the image of the field opening 42 on division type sensors 53a and 53b disposed on a sensor surface 54 through the field openings 46a and 46c and on a light source 50 through the remaining central opening 46b.

The field lens 45 has a power for substantially imaging the pupil of the photo-taking lens 41 on the light-intercepting plate 47, and the openings 46a, 46b and 46c are imaged on the pupil of the photo-taking lens 41 as indicated by areas D1–D3.

A light beam emitted from the light source 50 such as a light-emitting diode or a semiconductor laser passes through the secondary imaging lens 52, the central wedge prism 51b and the opening 46b and is imaged at the center of the field opening 42, i.e., on the optic axis of the photo-taking lens 41, and further passes through the area D2 on the pupil of the photo-taking lens 41 and is projected toward the object to be photographed. The reflected light from the object to be photographed is condensed by the photo-taking lens 41, and passes through the optical filter 44 and through the openings 46a, 46c and the wedge prisms 51a, 51c and is imaged on the division type sensors 53a and 53b by the secondary imaging lens 52.

In the present embodiment, the projection system is designed to project the light beam along the optic axis of the photo-taking lens 41 and therefore, even if the photo-taking lens 41 is not properly focus-adjusted to the object to be photographed, the projected light spot does not deviate from the object to be photographed. The projection system basically is substantially the same as that of FIG. 2A, but the wedge prisms 51a and 51c are both designed to deflect the light beam upwardly in order to vertically deviate the light source 50 and the sensor surface 54, and the deflection angles thereof differ from each other correspondingly to the division type sensors 53a and 53b.

In this embodiment, the areas on the pupil of the photo-taking lens 41, through which the projected and received light beams pass are disposed point-symmetrically with respect to the optic axis as indicated by D2–D3 and therefore, there is a possibility of the light reflected by the inner surface of the photo-taking lens 41 coming around to the light-receiving optical system.

Figure 6A:
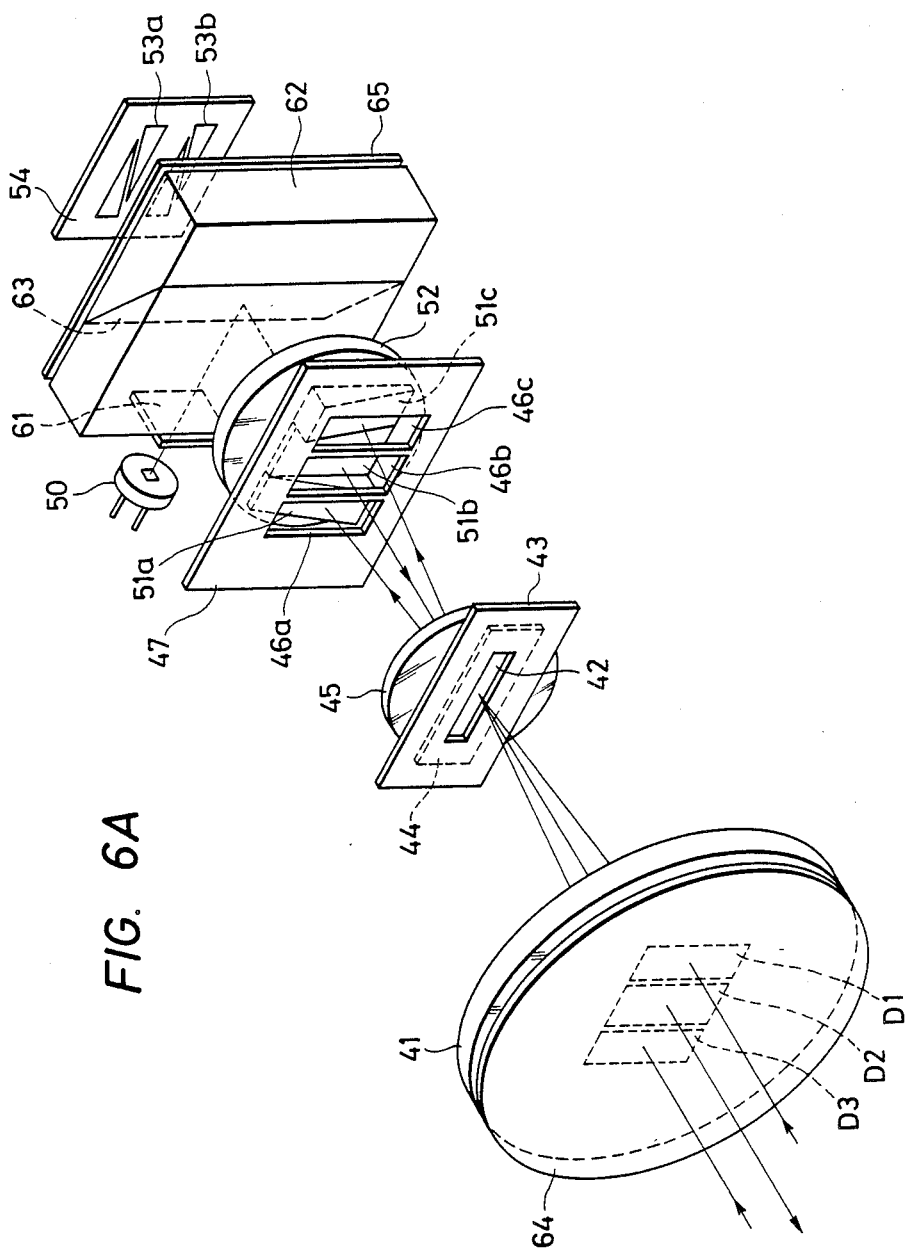
FIGS. 6A and 6B show still another embodiment of the present invention.
Figure 6B:
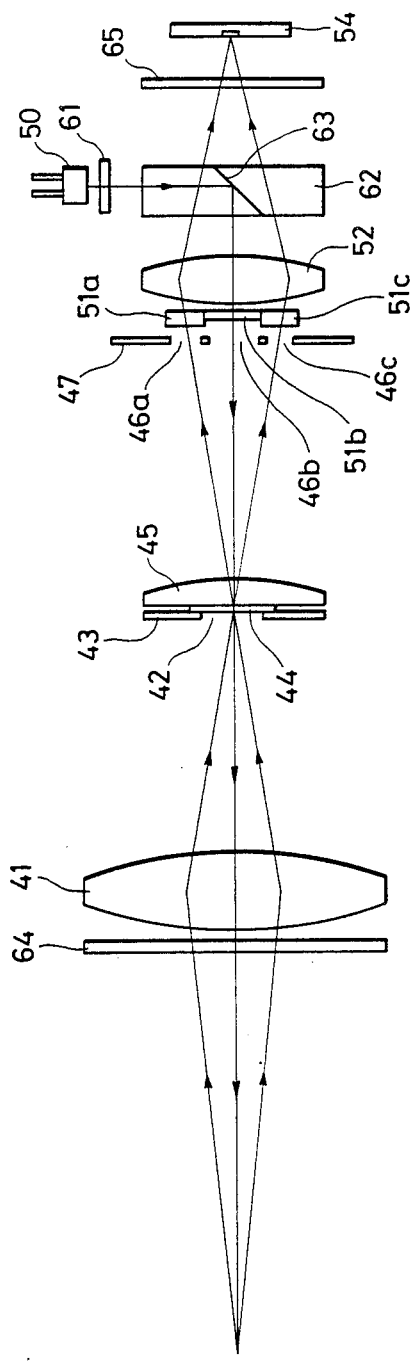

An embodiment which is improved in this point by utilization of polarization is shown in FIG. 6A and FIG. 6B which is a side view corresponding to FIG. 6A. In FIGS. 6A and 6B, members similar to those of FIG. 5 are given similar reference numerals and need not be described. In FIG. 6A, the light beam emitted from the light source 50 has only its S-polarized component transmitted through a polarizing plate 61 and is reflected toward the secondary imaging lens 52 by a beam splitter surface 63 in a polarizing beam splitter 62. As the polarizing beam splitter 62, use is made of one having the property of reflecting S-polarized light and transmitting P-polarized light therethrough.

The S-polarized projected light thus reflected passes through the secondary imaging lens 52 and the opening 46b and is imaged at the center of the field opening 42 and is projected through the area D2 of the pupil of the photo-taking lens 41 toward the object to be photographed. Since, however, a quarter wavelength plate 64 is disposed immediately forwardly of the photo-taking lens 41, the S-polarized projected light becomes a circularly polarized light after it has passed through the quarter wavelength plate 64. The light diffused and reflected from the object to be photographed is non-polarized light, and only the light beams having passed through the areas D1 and D3 of the pupil of the photo-taking lens 41, while remaining non-polarized light after having passed through the quarter wavelength plate 64, pass through the field opening 42, the openings 46a, 46c and the wedge prisms 51a, 51c and form images on the division type sensors 53a and 53b by the secondary imaging lens 52.

In this case, the P-polarized component of the light beam passes through the polarizing beam splitter 62 and for this reason, a polarizing plate 65 passing only the P-polarized light therethrough is disposed immediately rearward of the polarizing beam splitter 62.

The light returning to the sensor surface 54 due to the inner surface reflection occurring when it passes through the optical system is S-polarized light and therefore, most of such light is absorbed by the polarizing plate 65 and does not arrive at the sensor surface 54. In this manner, in the embodiment of FIG. 6A, the light reflected by the inner surface can be prevented from coming around to the sensors 53a and 53b.

As described above, the focus detecting apparatus according to the present invention is of the TTL active type where the object distance is short and can accomplish the in-focus detection by the TTL passive system even if the object distance is long but if the object to be photographed is sufficiently bright, and can always provide an output signal of good S/N ratio even when the object to be photographed is dark or at a long distance, thereby accomplishing highly accurate in-focus detection in a wide photo-taking range, and this leads to an advantage that the reliability of the TTL type focus detecting apparatus can be remarkably improved.

We claim:

1. A focus detecting apparatus for detecting the focus state of an objective lens, including:
   a light source;
   a projecting optical system for projecting a light produced by said light source onto an object through a first area of the pupil of said objective lens;
   a light-receiving optical system for forming a plurality of object images on the basis of lights passing through second and third areas of the pupil of said objective lens;
   a sensor for sensing said object images to obtain a signal necessary for detecting the focus state of said objective lens; and
   a field lens disposed near the predetermined imaging plane of said objective lens, said projecting and light-receiving optical systems being disposed rearward of the image of the pupil of said objective lens formed by said field lens.

2. A focus detecting apparatus according to claim 1, wherein said second and third areas deviate from a position point-symmetrical with said first area with respect to the optic axis of said objective lens.

3. A focus detecting apparatus according to claim 1, wherein said projecting optical system projects the light from said light source so that it intersects the optic axis of said objective lens near the predetermined imaging plane of said objective lens.

4. A focus detecting apparatus according to claim 1, wherein an opening for controlling the field of view of said sensor is provided near the predetermined imaging plane of said objective lens.

5. A focus detecting apparatus according to claim 4, wherein said opening is formed so that it is longer in the direction along the direction of movement of the object images on said sensor corresponding to the focus state of said objective lens than in the other direction.

6. A focus detecting apparatus according to claim 5, wherein the optic axis of said projecting optical system lies in a plane containing the lengthwise direction of said opening and the optic axis of said objective lens.

7. A focus detecting apparatus according to claim 1, wherein the optic axis of said objective lens lies in said first area.

8. A focus detecting apparatus according to claim 7, wherein deflecting plates different in direction of deflection are disposed in front of said light source and said sensor, respectively.

9. A focus detecting apparatus according to claim 8, wherein a quarter wavelength plate is disposed forward of said objective lens.

10. A focus state detecting apparatus for detecting the focus state of an objective optical system comprising:
- a light receiving optical system for forming a light pattern of an object with parallax on the basis of a light flux passing through a receiving area in a pupil of said objective optical system;
- sensing means for sensing said light pattern to obtain a signal for detecting the focus state of said objective optical system;
- light projection means for projecting a projecting light on said object through said objective optical system so that said sensing means receives the light reflected from said object;
- separation means for separating an area of a pupil of said objective optical system through which said projection light passes, from said receiving area; and
- a field lens provided with said objective optical system and said light receiving optical system.

11. A focus state detecting apparatus for detecting the focus state of an objective optical system comprising:
- sensing means, having a plurality of light receiving areas used for detecting a light pattern of an object, for providing a signal for detecting the focus state of said objective optical system;
- light receiving optical system for forming light patterns respectively in said light receiving areas on the basis of light flux passing through a receiving area in a pupil of said objective optical system;
- light projection means for projecting a projection light to said object through said objective optical system so that said sensing means receives the light reflected from said object;
- means for limiting the light to separate an area of the pupil of said objective optical system through which the projection light passes from said receiving area; and
- a field lens provided between said objective optical system and said light receiving optical system.

12. A focus state detecting apparatus for detecting the focus state of an objective optical system comprising:

(a) a light receiving optical system for forming a light pattern of object images on the basis of a light flux passing through a receiving area in a pupil of said objective optical system, the distance between said object images varying according to the adjustment of said objective optical system;

(b) sensing means for sensing said light pattern to output a signal;

(c) detecting means for detecting the focus state of said objective optical system on the basis of said output signal from said sensing means;

(d) light projection means for projecting a projecting light on said object through said objective optical system so that said sensing means receives the light reflected from said object; and (e) separation means for separating an area of a pupil of said objective optical system through which said projection light passes from said receiving area.

13. A focus state detecting apparatus according to claim 12, wherein an optical axis of said light receiving system is inclined with respect to an optical axis of said objective optical system.

14. A focus state detecting apparatus according to claim 12, wherein an optical axis of said light receiving optical system is identical with an optical axis of said objective optical system.

15. A focus state detecting apparatus according to claim 13, wherein said light receiving optical system comprises a re-imaging lens and a double wedge prism.

16. A focus state detecting apparatus according to claim 13, wherein said separation means is a mask having an aperture different from two apertures through which light flux passing through said light receiving system passes.

17. A focus state detecting apparatus according to claim 12, wherein a field lens is provided between said objective optical system and said light receiving optical system.

18. A focus state detecting apparatus for detecting the focus state of an objective optical system comprising:
- a light receiving optical system for forming a light pattern of an object with parallax on the basis of a light flux passing through a receiving area in a pupil of said objective optical system;
- sensing means for sensing said light pattern to obtain a signal for detecting the focus state of said objective optical system;
- light projection means for projecting a projecting light on said object through said objective optical system so that said sensing means receives the light reflected from said object;
- separation means for separating an area of a pupil of said objective optical system through which said projection light passes, from said receiving area; and
- a field lens provided between said objective optical system and said light receiving optical system.

* * * * *